United States Patent [19]

Franke

[11] Patent Number: 4,859,749
[45] Date of Patent: Aug. 22, 1989

[54] PROCESS FOR THE PREPARATION OF A POLYOLEFIN WITH A WIDE MOLECULAR MASS DISTRIBUTION

[75] Inventor: Rainer Franke, Niedernhausen/Taunus, Fed. Rep. of Germany

[73] Assignee: Hoechst Aktiengesellschaft, Frankfurt am Main, Fed. Rep. of Germany

[21] Appl. No.: 218,655

[22] Filed: Jul. 13, 1988

[30] Foreign Application Priority Data

Jul. 16, 1987 [DE] Fed. Rep. of Germany ....... 3723526

[51] Int. Cl.$^4$ .......................... C08F 4/64; C08F 10/02
[52] U.S. Cl. ...................................... 526/124; 526/65; 526/125; 526/348.6; 526/352; 526/905
[58] Field of Search .................................. 526/124, 65

[56] References Cited

U.S. PATENT DOCUMENTS 3,644,318 2/1972 Diedrich et al. .................... 526/124

FOREIGN PATENT DOCUMENTS 0057352 8/1982 European Pat. Off. .
1233599 5/1971 United Kingdom .

*Primary Examiner*—Edward J. Smith

[57] ABSTRACT

A two-stage polymerization process using a modified supported catalyst gives ethylene polymers with very good processability and excellent finished component properties. The supported catalyst used is formed by reaction of a magnesium alcoholate with a titanium-IV compound in suspension and subsequent reaction with a halogen-containing organoaluminum compound and activation of the solid thus obtained by an aluminum trialkyl or aluminum isoprenyl.

4 Claims, No Drawings

PROCESS FOR THE PREPARATION OF A POLYOLEFIN WITH A WIDE MOLECULAR MASS DISTRIBUTION

DESCRIPTION

The present invention relates to a process for the preparation of a polyolefin with an extremely wide molecular mass distribution by a two-stage polymerization.

It is known that bimodal polyethylene, that is to say polyethylene with two molecular masses, has improved properties in comparison with monomodal polyethylene. This applies to the ability to flow and the resistance to stress-cracking.

A process is known for the preparation of polymodal ethylene polymers in which ethylene is polymerized in two stages in the presence of a halogen-containing organoaluminum compound, a transition metal compound and different amounts of hydrogen in each stage (compare German Offenlegungsschrift No. 1,800,695 = British Patent No. 1,233,599).

A process is furthermore known for the preparation of olefin polymers by a two-stage polymerization, a highmolecular polymer being prepared in the first stage at a low $H_2/C_2H_4$ ratio and a low-molecular polymer being prepared in the second stage at a high $H_2/C_2H_4$ ratio (cf. EP-A No. 57,352). The catalyst used is, inter alia, a halogen-containing organoaluminum compound together with the reaction product of an oxygen-containing organomagnesium compound and an oxygen-containing organotitanium compound, both of which are in solution, and an aluminum halide.

Both known processes give polyolefins with a good processability and good physical properties. Film produced from these polyolefins shows only few fish eyes. However, in both processes the catalyst component containing the transition metal must be freed from excess reaction products after its preparation by washing with an inert solvent. The resulting wash liquors must be worked up, which is very cumbersome and expensive and pollutes the environment. Halogen-containing aluminum alkyls are moreover used as activators in accordance with EP-A No. 57,352. This leads to a higher halogen content in the polymer. A consequence of this is a higher corrosiveness and accordingly a larger amount of acidtrapping agent in the polymer in order to prevent corrosion of machine components.

Finally, a process for the polymerization of alphaolefins is known, in which a catalyst is used in which the transition metal component has been formed by reacting a magnesium alcoholate with a quadravalent, halogencontaining titanium compound and washing the solid reaction product with an inert solvent (compare German Auslegeschrift No. 1,795,19 = U.S. Pat. No. 3,664,318). However, only polyolefins with a very narrow molecular mass distribution, which are not suitable for all applications, are obtained in this process.

There was thus the object of discovering a process in which polyolefins with good processability, good physical properties and diverse applicability are obtained and which is easy to carry out.

It has been found that this object can be achieved with a two-stage process using a modified supported catalyst.

The invention thus relates to a process for the preparation of a polyolefin by two-stage polymerization of ethylene with 0 to 10% by weight, based on the total amount of monomers, of a 1-olefin of the formula $R^6$—$CH$=$CH_2$, in which $R^6$ denotes a straight-chain or branched alkyl radical with 1 to 12 carbon atoms, in suspension or in the gas phase at a temperatue of 20 to 120° C. under a pressure of 2 to 60 bar in the presence of a mixed catalyst consisting of a transition metal component (component (a)), which is the reaction product of a magnesium alcoholate with a titanium compound and an organoaluminum compound, and an organoaluminum compound, the average molecular mass being regulated by hydrogen, which comprises carrying out the polymerization in the presence of a mixed catalyst, component (a) of which has been prepared by reaction of a magnesium alcoholate, suspended in an inert dispersing agent, of the formula (I)

$$Mg(OR^1)(OR^2) \qquad (I)$$

in which $R^1$ and $R^2$ are identical or different and denote an alkyl radical with 1 to 6 carbon atoms, with a titanium-IV compound of the formula (II)

$$TiX_m(OR^3)_{4-m} \qquad (II)$$

in which $R^3$ denotes an alkyl radical with 1 to 6 carbon atoms, X denotes a halogen atom and m is a number from zero to 4, and subsequent reaction with an organoaluminum compound of the formula III $$AlR^4{}_n(OR^5)_p X_{3-n-p} \qquad (III)$$

in which $R^4$ and $R^5$ are identical or different and denote an alkyl radical with 1 to 12 carbon atoms, X denotes a halogen atom, n is a number from zero to 2 and p is a number from zero to 1, and is introduced only into the first polymerization stage, and component (b) of the mixed catalyst being an aluminumtrialkyl with 1 to 12 carbon atoms in the alkyl radicals or aluminumisoprenyl, the molar ratio of component (a) to component (b), based on titanium and aluminum, being 1:1 to 1:500, the molar ratio of hydrogen to ethylene in the gas space being 1:0.01 to 1:0.5 in the one polymerization stage and 1:0.1 to 0.1:8 in the other polymerization stage, and the ratio of the amounts of polyolefins formed in the two polymerization stages being 30:70 to 70:30.

A magnesium alcoholate of the formula (I)

$$Mg(OR^1)(OR^2) \qquad (I)$$

in which $R^1$ and $R^2$ are identical or different and denote an alkyl radical with 1 to 6, preferably 2 to 4, carbon atoms, is used for the preparation of the mixed catalyst to be used according to the invention. Examples are $Mg(OCH_3)_2$, $Mg(OC_2H_5)_2$, $Mg(O$—i—$C_3H_7)_2$, $Mg(O$—n-$C_3H_7)_2$, $Mg(O$—n—$C_4H_9)_2$, $Mg(OCH_3)(OC_2H_5)$ and $Mg(OC_2H_5)(O$—n—$C_3H_7)$. The simple magnesium alcoholates $Mg(OC_2H_5)_2$, $Mg(O$—n—$C_3H_7)_2$ and $Mg(O$—i—$C_4H_9)_2$ are preferably used.

The magnesium alcoholate is reacted in an inert dispersing agent with a quadravalent titanium compound of the formula (II)

$$TiX_m(OR^3)_{4-m} \qquad (II)$$

in which $R^3$ denotes an alkyl radical with 1 to 6, preferably 1 to 3, carbon atoms, X denotes a halogen atom, preferably chlorine, and m is zero to 4, preferably 2 to 4.

Examples which may be mentioned are TiCl$_4$, Ti(OC$_2$H$_5$)Cl$_3$, Ti(OC$_2$H$_5$)$_2$Cl$_2$, Ti(OC$_2$H$_5$)$_3$Cl, Ti(O—i—C$_3$H$_7$)$_3$Cl, Ti(O—i—C$_3$H$_7$)$_2$Cl$_2$, Ti(O—i—C$_3$H$_7$)$_3$Cl, Ti(O—n—C$_4$H$_9$)$_3$Cl, Ti(O—n—C$_4$H$_9$)$_2$Cl$_2$, Ti(O—n—C$_4$H$_9$)$_3$Cl, Ti(O—i—C$_4$H$_9$)$_3$Cl, Ti(O—i—C$_4$H$_9$)$_2$Cl$_2$, Ti(O—i—C$_4$H$_9$)$_3$Cl, Ti(O—n—C$_4$H$_9$)$_4$ and Ti(O—n—C$_3$H$_7$)$_4$. TiCl$_4$ and Ti(O—n—C$_4$H$_9$)$_2$Cl$_2$ are preferably used.

The reaction of the magnesium alcoholate with the titanium compound is carried out at a temperature of 0° to 150° C., preferably at 50° to 120° C. The titanium compound is brought together with the magnesium alcoholate in the course of 0.5 to 20, preferably in the course of 3 to 10 hours, preferably by adding a solution of the titanium compound to a suspension of the magnesium alcoholate.

The solid formed is then reacted with a halogen-containing organoaluminum compound of the formula (III)

$$\text{AlR}^4{}_n(\text{OR}^5)_p X_{3-n-p} \qquad (III)$$

in which R$^4$ and R$^5$ are identical or different and denote an alkyl radical with 1 to 12, preferably 1 to 4, carbon atoms, X is a halogen atom, preferably chlorine, n is a number from zero to 2, preferably 1 to 2, and p is a number from zero to 1, preferably 0 to 0.5. Suitable organoaluminum compounds are Al(C$_2$H$_5$)$_2$Cl, Al(C$_2$H$_5$)$_2$Cl, Al(C$_2$H$_5$)Cl$_2$, Al(n—C$_3$H$_7$)$_2$Cl, Al(n—C$_3$H$_7$)Cl$_2$, Al(n—C$_4$H$_9$)Cl$_2$, Al(i—C$_4$H$_9$)$_2$Cl, Al(i—C$_4$H$_9$)Cl$_2$, Al(C$_2$H$_5$)Cl$_2$, Al(n—C$_4$H$_9$)$_2$Cl and Al(n—C$_4$H$_9$)(OC$_2$H$_5$)Cl and equimolar mixtures of the mono- and dihalides, the so-called aluminumalkylsesquihalides or mixtures of mono- and dihalides of different composition. Of this group, Al(C$_2$H$_5$)Cl$_2$ and Al$_2$(C$_2$H$_5$)$_3$Cl$_3$ are preferably used.

The reaction is carried out at a temperature of 0° to 150° C., preferably at 50° to 120° C., the reaction partners being brought together in the course of 0.5 to 20, preferably in the course of 2 to 8 hours.

Suitable inert dispersing agents for the abovementioned reactions are aliphatic or cycloaliphatic hydrocarbons, such as butane, pentane, hexane, heptane, cyclohexane, methylcyclohexane and isooctane, and aromatic hydrocarbons, such as benzene and xylene. Benzine and hydrogenated diesel oil fractions which have been thoroughly freed from oxygen, sulfur compounds and moisture can also be used.

The magnesium alcoholate, quadravalent titanium compound and organoaluminum compound are used in a ratio of Mg:Ti:Al of 1:0.05 to 2:0.3 to 5, preferably 1:0.2 to 1.0:0.4 to 1.5.

The suspension thus prepared from the catalyst component (a) is used directly for the polymerization.

An aluminumtrialkyl with 1 to 12 carbon atoms in the alkyl radicals, for example Al(C$_2$H$_5$)$_3$, Al(i—C$_4$H$_9$)$_3$ or Al(i—C$_8$H$_{17}$)$_3$, or the reaction product, known as "aluminumisoprenyl", of an aluminumtrialkyl or -dialkyl hydride with isoprene, is used as the catalyst component (b). Al(C$_2$H$_5$)$_3$ is preferred.

The polymerization is carried out in two stages, preferably as suspension polymerization in an inert dispersing agent. The same solvents as have been described for the preparation of catalyst component (a) are suitable dispersing agents. However, polymerization in the gas phase is also possible.

The reaction temperature in both reaction stages is 20° to 120° C., preferably 70° to 90° C. The pressure is in the range from 2 to 60, preferably 4 to 20 bar.

The catalyst component (a) is introduced continuously and exclusively into the first reaction stage. The catalyst component (b) is also introduced continuously into the first stage, and if appropriate additionally into the second stage. The ratio of component (a) to component (b), based on titanium and aluminum, is 1:1 to 1:500, preferably 1:5 to 1:100.

Polyolefins with different average molecular masses are formed in both reaction stages in that the molar ratio of hydrogen to ethylene in the gas space of the two reaction zones is adjusted, by addition of ethylene and hydrogen, to values of 1:0.01 to 1:0.5 in one stage and 1:0.1 to 1:8 in the other stage.

The ratio of the amounts of the polyolefins in each case formed in reaction stages 1 and 2 is in the range from 30:70 to 70:30, the polymer formed in reaction stage 1 being transferred continuously into stage 2. The final polymer mixture is removed continuously from stage 2.

A polymer which has a higher or a lower average molecular mass than the product formed in the second stage can be formed in the first reaction stage. If it has a higher average molecular mass, its viscosity number is in the range from 1,400 to 200 cm$^3$/g (measured in 0.1% strength decahydronaphthalene solution at 135° C.), and otherwise is in the range from 40 to 150 cm$^3$/g. The viscosity number of the product of the second reaction stage is in the range from 200 to 500 cm$^3$/g. The in situ mixture of two components with widely differing average molecular masses gives an overall polymer with an extremely wide bimodal molecular mass distribution.

With the catalyst system to be used according to the invention, ethylene or ethylene with up to 10% by weight, based on the total amount of monomers, of a 1-olefin of the formula R$^6$—CH=CH$_2$, in which R$^6$ denotes a straight-chain or branched alkyl radical with 1 to 12, preferably 1 to 10, carbon atoms, is polymerized. Examples are propylene, 1-butene, 1-pentene, 1-hexene, 4-methylpent-1-ene and 1-octene, and propylene, butene and hexene are preferably used. For this, the comonomer is preferably introduced into the stage in which a polymer with the higher molecular mass is produced.

The overall polymer from the second polymerization stage is separated off from the dispersing agent in a known manner and dried.

One advantage of the catalyst system to be used according to the invention is that it hydrogenates considerably less in the presence of hydrogen than comparable known catalyst systems. In the process according to the invention, this leads to a reduction in the ethane formation and thus to an increase in the ethylene conversion.

Another advantage of this catalyst system is the very good response to hydrogen, which is specifically necessary for carrying out this process. In this process, a very low-molecular polyethylene must be prepared in one of the two stages, which usually can be achieved only with a very high hydrogen concentration in the gas phase. With the catalyst system according to the invention, products with a very low molecular weight can already be achieved at significantly lower hydrogen concentrations than with the catalyst systems used to date. On the one hand higher ethylene partial pressures and thus higher contact yields and on the other hand a lower hydrogen consumption can thereby be achieved. The catalyst activity furthermore decreases less, even at high hydrogen concentrations in the gas space of the reactor, than with known catalysts.

Another decisive advantage of the process according to the invention is the very easy preparation of the transition metal component of the catalyst. This is obtained by simply bringing together the individual components under the corresponding reaction conditions. The washing with an inert hydrocarbon which is customary in most cases is dispensed with. There is thus also no wash liquor which has to be first dissociated again in further process steps and worked up to give an effluent.

Moreover, even with prolonged continuous operation, no polymer deposits are formed on the kettle walls and the connecting lines.

The process according to the invention gives ethylene polymers for extrusion and extrusion blow molding with a wide to very wise molecular mass distribution. The polymers are distinguished by excellent processing and finished component properties. By adapting the process parameters, film raw materials, pipe raw materials, tape raw materials, monofilament raw materials and small hollow body raw materials with very good and balanced properties can be prepared in this process.

The film raw materials are distinguished by their good processability on almost all HDPE film lines, coupled with a low pressure build-up and high bubble stability and good production properties, such as absence of fish eyes, good film structure and good toughness.

The pipe raw materials have an excellent toughness and density-stress cracking relationship, coupled with good processability.

The tape and monofilament raw materials can be reliably processed on tape and monofilament lines.

The small hollow body raw materials give shaped articles with very good stress-cracking properties.

EXAMPLES

A hydrogenated benzine fraction with a boiling range from 120° to 140° C. was used in the following examples for the preparation of the catalyst component (a) and for the polymerization.

The titanium content of the catalysts was determined colorimetrically. A single-stage test polymerization was first carried out with each catalyst.

The melt flow indices MFI 190/5, MFI 190/15 and MFI 190/21.6 were determined in accordance with DIN 53 735. The MFR (21.6/5) is calculated from the quotient of the MFI 190/21.6 to MFI 190/5, and the MFR (15/5) is calculated from the quotient of the MFI 190/15 to MFI 190/5.

The viscosity VN was determined in accordance with DIN 53 728 sheet 4 with an Ubbelohde viscometer in decahydronaphthalene as the solvent.

The density was determined in accordance with DIN 53 479, method A, and the bulk density was determined in accordance with DIN 53 368.

The $a_k 23°$ C. values were determined in accordance with DIN 53 453.

The longitudinal and transverse tear propagation resistance (TPR(l); TPR(t)) was determined in accordance with ISO 6383/2.

The resistance to stress-cracking was determined in accordance with DIN 55 457, page 2, supplementary sheet 1.

The dart drop values were measured in accordance with ASTM D 1709-67 method A.

The pipe creep was determined in accordance with DIN 8075, section 2.3, Table 1.

EXAMPLE 1

1.1 Preparation of catalyst component (a) 57 g (=500 mmol) of magnesium methylate and 500 c$^3$ of a hydrogenated benzine fraction were taken in a lb 4 dm$^3$ stirred vessel with exclusion of air and moisture. 500 cm$^3$ of a 0.2 molar solution of TiCl$_4$ in the benzine fraction were added at a temperature of 100° C. in the course of 2 hours, while stirring and covering with a layer of argon.

500 mmol of AlCl$_2$(C$_2$H$_5$) in 1,000 cm$^3$ of the benzine fraction were added dropwise into the resulting suspension at the same temperature, with stirring, dropwise addition time 2 hours. The mixture was then stirred at 100° C. for a further 2 hours. A reddishbrown precipitate was formed. Complete conversion of the titanium into the trivalent stage was established by determination of the Ti$^{3+}$ content and the total titanium content. The suspension contained 0.065 mol of Ti/dm$^3$. A portion of this suspension was diluted with the benzine fraction to a Ti concentration of 0.01 mol/dm$^3$.

1.2 Ethylene polymerization 1.5 cm$^3$ of a 1 molar triethylaluminum solution and 1 cm$^3$ of the suspension prepared according to 1.1 (0.01 mmol/dm$^3$, based on Ti) were introduced at 85° C., under a layer of N$_2$, into a 2 dm$^3$ steel autoclave which was charged with 750 cm$^3$ of a benzine fraction. 3 bar of hydrogen were then introduced and 4 bar of ethylene were forced in. The total pressure of 7 bar was maintained for 2 hours by topping up the ethylene consumed. The polymerization was interrupted by letting down the gases and the polymer was separated off from the dispersing agent by filtration and drying. 225 g of polyethylene with an MFI 190/5 of 24 g/10 minutes and an MFR (15/5) of 4.8 were formed. This corresponds to a catalyst time yield KZA$_{red}$ of 2,810 g/mmol.Ti.bar.hour. The powder had a bulk density of 0.39 g/cm$^3$ and a fine particle content <100 μm of 2.1% by weight.

1.3 Continuous two-stage polymerization 72 dm$^3$/hour of hexane, 24 kg/hour of ethylene, 1 mmol/hour of catalyst component (a), prepared according to 1.1, and 36 mmol/hour of triethylaluminum were introduced continuously at a temperature of 83° C. into the first of two 600 l stirred kettles connected in series. Hydrogen was metered in so that a hydrogen partial pressure of 7.2 bar and an ethylene partial pressure of 2 bar was established. The resulting polymer suspension was transferred via an immersed pipe with a valve, connected to a static holder on the first kettle, into the second kettle. 24 kg/hour of ethylene, 96 dm$^3$/hour of hexane, 48 mmol/hour of aluminum triethyl and 3 dm$^3$/hour of 1-butene were introduced into the second kettle at a temperature of 80° C. A hydrogen/ethylene ratio of 0.18 was established in the gas space of the second kettle by removing a certain amount of gas. The polymer from the second reactor was largely separated off from the hexane in a centrifuge and dried in a curent of N$_2$. 48 kg/hour of ethylene copolymer with an MFI 190/5 of 0.64 g/10 minutes, an MFR (21.6/5) of 26.5, a density of 0.944 g/cm$^3$ and a VN of 340 cm$^3$/g were formed. The polymer from the first stage had a VN of 40 cm$^3$/g. The catalyst yield KA was 48 kg/mmol of Ti. The powder was stabilized with 0.2% by weight of Ca stearate and 0.1% by weight of octadecyl 3-(3,5-di-t-butyl-4-hydroxyphenyl)-propionate and granulated on a twin-screw granulating machine with a throughput of 75 kg/hour. The granules had an MFI 190/5 of 0.45 g/10 minutes, an MFR (21.6/5) of 28.3, a density of 0.945 g/cm$^3$ and a VN of 330 cm$^3$/g.

The granules could be processed on a pipe extruder at a high production rate to a pipe (32 mm) with a very smooth pipe surface. In addition to very good toughness ($a_{k23°C.}=17.5$ mJ/mm$^2$), the pipe had an excellent life ($\sigma_5 \geq 6,400$ hours) in the creep test.

EXAMPLES 2 TO 5

The polymerization was carried out as described in Example 1 with the same catalyst system. The polymerization and product parameters are summarized in Table 1.

After stabilization and granulation of the powders on the twin-screw extruder described above, granules were obtained from which 20 μm film with excellent properties could be produced on a blown HDPE film line (Table 2).

EXAMPLE 6

6.1 Preparation of catalyst component (a) 71 g (=500 mmol) of magnesium isopropylate and 500 cm$^3$ of a hydrogenated oxygen-free benzine fraction were taken in a 4 dm$^3$ stirred vessel with exclusion of air and moisture. 16.5 cm$^3$ of TiCl$_4$ (=150 mmol), dissolved in 400 cm$^3$ of the benzine fraction, were added at a temperature of 90° C. in the course of 5 hours, while stirring and covering with a layer of argon. 400 mmol of Al$_2$Cl$_3$(C$_2$H$_5$)$_3$ in 1,000 cm$^3$ of the benzine fraction were added dropwise to the resulting suspension at the same temperature in the course of 2 hours, with stirring. The mixture was then stirred at 120° C. for two hours. A dark brown precipitate was formed. The suspension contained 0.076 mmol of Ti/dm$^3$. The Ti$^{3+}$ content was 99% by weight. A portion of this suspension was diluted with the benzine fraction to a Ti concentration of 0.01 mol/dm$^3$.

6.2 Ethylene polymerization 1.5 cm$^3$ of a 1 molar triisobutylaluminum solution and 1.5 cm$^3$ of the suspension prepared according to 6.1 (0.015 mmol/dm$^3$, based on Ti) were introduced at 85° C. under N$_2$ into a 2 dm$^3$ steel autoclave charged with 750 cm$^3$ of a hydrogenated benzine fraction. 3 bar of hydrogen were then introduced and 4 bar of ethylene were forced in. The total pressure of 7 bar was maintained for 2 hours by topping up the ethylene consumed. The polymer was separated off from the dispersing agent by filtration and drying. 196 g of polyethylene with an MFI 190/5 of 19 g/10 minutes and an MFR (15/5) of 5.0 were formed. This corresponds to a catalyst time yield KZA$_{red}$ of 1,630 g/mmol of Ti.bar. hour. The powder had a bulk density of 0.38 g/cm$^3$ and a fine particle content 100 μm of 6.5% by weight.

EXAMPLES 7 TO 10 AND COMPARISON EXAMPLES A AND B

Continuous two-stage polymerizations were carried out under the conditions described in Example 1.3, catalyst component (a) according to Example 6.1 being used for the examples according to the invention.

Catalyst component (a) according to Example 5 of German Auslegeschrift No. 1,795,197 was used for the comparison examples and was prepared as follows:

11 g of Mg(OC$_2$H$_5$)$_2$ were suspended in 50 cm$^3$ of diesel oil (boiling range 130 to 160° C.), and 200 cm$^3$ of a 1 molar TiCl$_4$ solution in diesel oil were added. The suspension was boiled under reflux for 15 hours. The precipitate was then washed 6 times with 150 cm$^3$ of diesel oil by decanting and stirring. The volume of the suspension was made up to 250 cm$^3$. 10 cm$^3$ of suspension contained 2.1 mmol of titanium compound.

After stabilization and granulation of the powders on the twin-screw extruder already described, granules with the properties summarized in Table 2 were obtained. 20 μm film with the properties shown in Table 2 was obtained on a blown film line.

EXAMPLE 11

11.1 Preparation of catalyst component (a)

57 g (=500 mmol) of magnesium ethylate and 500 cm$^3$ of a hydrogenated benzine fraction were taken in a 4 dm$^3$ stirred vessel with exclusion of air and moisture. 600 cm$^3$ of a 0.2 molar TiCl$_3$(OiC$_3$H$_7$) solution in the benzine fraction were added at a temperature of 90° C in the course of 5 hours, while stirring and covering with a layer of argon. 1,000 cm$^3$ of a 0.5 molar Al$_2$Cl$_3$(C$_2$H$_5$)$_3$ solution in the benzine fraction were then added dropwise to the resulting suspension at 100° C. in the course of 2 hours and the mixture was stirred at this temperature for a further 2 hours. The resulting solid catalyst contained titanium all in the trivalent form. The suspension contained 0.056 mol of Ti/dm$^3$.

A portion of this suspension was diluted with the benzine fraction to a Ti concentration of 0.01 mol/dm$^3$.

11.2 Ethylene polymerization 1.5 cm$^3$ of a 1 molar triethylaluminum solution and 1 cm$^3$ of the suspension prepared according to 11.1 (0.01 mmol/dm$^3$, based on Ti) were introduced at 85° C. under N$_2$ into a 2 dm$^3$ steel autoclave charged with 750 cm$^3$ of the benzine fraction. 3 bar of hydrogen were then introduced and 4 bar of ethylene were forced in. The total pressure of 7 bar was maintained for 2 hours by topping up the ethylene consumed. The polymerization was interrupted by letting down the gases and the polymer was separated off from the dispersing agent by filtration and drying. 195 g of polyethylene with an MFI 190/5 of 28 g/10 minutes and an MFR (15/5) of 4.6 were formed. This corresponds to a catalyst time yield KZA$_{red}$ of 2,440 g/mmol of Ti.bar.hour. The powder had a bulk density of 0.41 g/cm$^3$ and a fine particle content <100 μm of 1.6% by weight.

EXAMPLES 12 TO 15 AND COMPARISON EXAMPLES C AND D

The polymerization was carried out as described in Example 1.3, but with the catalyst system described under 11.1 in the examples according to the invention. The polymerization and product parameters are summarized in Table 3.

For the comparison examples, the catalyst component (a) prepared in German Auslegeschrift 1,795,197, Example 1, was used and was prepared as follows:

11 g of Mg(OC$_2$H$_5$)$_2$ were suspendd in 50 cm$^3$ of diesel oil (boiling range 130° to 160° C.), and 200 cm$^3$ of a 1 molar TiCl$_2$(OiC$_3$H$_7$)$_2$ solution in cyclohexane were added. The suspension was boiled under reflux for 7 hours. The precipitate was then washed 6 times with 150 cm$^3$ of cyclohexane by decanting and stirring. The volume of the suspension was made up to 250 cm$^3$. 10 cm$^3$ of the suspension contained 2.9 mmol of titanium compound.

After stabilization and granulation of the powders on the twin-screw extruder already described, the granules summarized in Table 2 were obtained.

The granules from Example 12 and 13 were processed to tapes on a tape line. No problems arose with either of the materials. The tapes had a very high tear strength. The granules from Comparison Example C could be processed on the same tape line only with great difficulty because of a large number of tear-offs.

The granules from Example 15 were processed to monofilament goods on a monofilament line without problems, and the stretchability of the product was excellent.

The granules from Example 14 were processed to bottles on a small hollow body machine. The bottles had a smooth surface free from fish eyes. In addition to an $a_{k23°\ C.}$ value of 16 mJ/mm², the product had an excellent resistance to stress-cracking.

Although the product from Comparison Example D could also be processed to bottles, the surface was speckled. The $a_{k23°\ C.}$ value at 12 mj/mm was significantly lower and the resistance to stress-cracking was poorer.

It can also be seen from Comparison Examples A to D that the catalyst system according to the invention has a considerably higher contact activity. The products prepared with the catalyst system according to the invention therefore have a considerably lower residual catalyst content.

COMPARISON EXAMPLE E

A 600 dm³ kettle was charged continuously at 80° C. with 1.0 mmol/hour of catalyst component (a) from Example 11.1, 24 kg/hour of ethylene, 72 dm³/hour of hexane, 36 mmol/hour of TEA and 0.1 dm³/hour of butene. The hydrogen was metered in so that an $H_2/C_2H_4$ ratio of 0.38 was established in the gas space. The polymer suspension was discharged continuously so that a constant filling volume of 480 dm³ was established in the kettle. The polyethylene was separated off by filtration and dried in a stream of $N_2$. A powder with an MFI 190/5 of 0.40 g/10 minutes, an MFR (21.6/5) of 10 and a density of 0.956 g/cm³ was formed. Granules with an MFI 190/5 of 0.28 g/10 minutes, an MFR 21.6/5 of 9.8 and a density of 0.956 g/cm³ were obtained by granulation on the twin-screw extruder. The material could not be processed to a usable film on the blown film line. The film had a very rough surface.

TABLE 1

| Stage | Example | | 2 | 3 | 4 | 5 |
|---|---|---|---|---|---|---|
| | Temperature | °C. | 83 | 83 | 83 | 83 |
| | Component (a) | mmol/h | 1.0 | 1.15 | 1.2 | 1.4 |
| | Ethylene | kg/h | 24 | 26 | 24 | 28 |
| 1 | Hexane | dm³/h | 72 | 78 | 72 | 84 |
| | AlR₃ | mmol/h | 36 (TEA) | 39 (TEA) | 36 (TIBA) | 42 (TIBA) |
| | $H_2/C_2H_4$ | | 3.6 | 3.6 | 4.0 | 4.0 |
| | VN | cm³/g | 50 | 46 | 60 | 70 |
| | Temperature | °C. | 80 | 80 | 80 | 80 |
| | Ethylene | kg/h | 24 | 22 | 24 | 20 |
| | Hexane | dm³/h | 96 | 88 | 96 | 80 |
| 2 | AlR₃ | mmol/h | 48 (TEA) | 44 (TEA) | 48 (TIBA) | 40 (TIBA) |
| | $H_2/C_2H_4$ | | 0.18 | 0.13 | 0.18 | 0.14 |
| | 1-Butene | dm³/h | 0.1 | 0.1 | 2.1 | 2.5 |
| | VN | cm³/g | 360 | 390 | 360 | 380 |
| | MFI 190/5 | g/10 min | 0.45 | 0.38 | 0.50 | 0.55 |
| | MFR (21.6/5) | | 28 | 34 | 27 | 36 |
| Powder | d | g/cm³ | 0.956 | 0.957 | 0.948 | 0.948 |
| | KA | kg/mmol | 48 | 42 | 40 | 34 |
| | MFI 190/5 | g/10 min | 0.32 | 0.25 | 0.28 | 0.27 |
| Granules | MFR (21.6/5) | | 29 | 36 | 28 | 36 |
| | d | g/cm³ | 0.957 | 0.957 | 0.949 | 0.948 |
| | Fish eyes/ | 1000 cm² | 10 | 18 | 13 | 22 |
| | DD | g | 300 | 380 | 260 | 290 |
| Film | TPR(t) | N | 5.2 | 5.5 | 7.2 | 7.8 |
| | TPR(l) | N | 4.1 | 4.3 | 6.5 | 6.8 |
| | Structure | | | | | |

TEA: triethylaluminum
TIBA: tri-i-butyl-aluminum
DD: dart drop value
TPR: tear propagation resistance
KA: catalyst yield

TABLE 2

| Stage | Example | | 7 | 8 | 9 | 10 | Comparison examples A | B |
|---|---|---|---|---|---|---|---|---|
| | Temperature | °C. | 85 | 85 | 85 | 85 | 85 | 85 |
| | Component (a) | mmol/h | 1.5 | 1.5 | 2.0 | 1.2 | 15 | 20 |
| | Ethylene | kg/h | 22 | 22 | 28 | 24 | 22 | 28 |
| 1 | Hexane | dm³/h | 66 | 66 | 84 | 72 | 66 | 84 |
| | AlR₃ | mmol/h | 33 (TEA) | 33 (TEA) | 42 (TEA) | 36 (TEA) | 33 (TEA) | 42(TEA) |
| | $H_2/C_2H_4$ | | 3.8 | 3.8 | 4.0 | 3.0 | 4.3 | 4.3 |
| | VN | cm³/g | 70 | 70 | 50 | 110 | 70 | 60 |
| | Temperature | °C. | 80 | 80 | 80 | 80 | 80 | 80 |
| | Ethylene | kg/h | 26 | 26 | 20 | 24 | 26 | 20 |
| | Hexane | dm³/h | 78 | 78 | 60 | 72 | 78 | 60 |
| 2 | AlR₃ | mmol/h | 39 (TEA) | 39 (TEA) | 30 (TEA) | 36 (TIBA) | 39 (TEA) | 30 (TEA) |
| | $H_2/C_2H_4$ | | 0.22 | 0.15 | 0.08 | 0.31 | 0.27 | 0.11 |
| | 1-Butene | dm³/h | 0.1 | 3.0 | 3.0 | 2.5 | 0.1 | 3.0 |
| | VN | cm³/g | 340 | 360 | 400 | 290 | 350 | 410 |
| | MFI 190/5 | g/10 min | 0.55 | 0.45 | 0.35 | 0.80 | 0.50 | 0.32 |
| | MFR (21.6/5) | | 24 | 23 | 35 | 20 | 25 | 36 |
| Powder | d | g/cm³ | 0.956 | 0.944 | 0.946 | 0.947 | 0.956 | 0.945 |

TABLE 2-continued

| Stage | Example | | 7 | 8 | 9 | 10 | Comparison examples A | Comparison examples B |
|---|---|---|---|---|---|---|---|---|
| | KA | kg/mmol | 32 | 32 | 24 | 40 | 3.2 | 2.4 |
| | MFI 190/5 | g/10 min | 0.35 | 0.27 | 0.21 | 0.49 | 0.30 | 0.19 |
| Granules | MFR (21.6/5) | | 25 | 23 | 36 | 21 | 26 | 36 |
| | d | g/cm³ | 0.957 | 0.944 | 0.947 | 0.947 | 0.957 | 0.945 |
| | Fish eyes/ | 1000 cm² | 24 | 21 | 21 | 15 | 86 | 73 |
| | DD | g | 290 | 240 | 290 | 190 | 250 | 260 |
| Film | TPR(t) | N | 6.5 | 7.2 | 8.3 | 4.3 | 6.1 | 7.3 |
| | TPR(l) | N | 3.2 | 4.8 | 6.2 | 2.8 | 0.8 | 1.8 |
| | Structure | | fine | fine | fine | fine | melt fracture | coarse |

TABLE 3

| Stage | Example | | 12 | 13 | 14 | 15 | Comparison examples C | Comparison examples D |
|---|---|---|---|---|---|---|---|---|
| | Temperature | °C. | 80 | 8 | 80 | 80 | 80 | 80 |
| | Component (a) | mmol/cm³ | 1.5 | 1.7 | 1.9 | 1.4 | 18 | 22 |
| | Ethylene | kg/h | 24 | 26 | 26 | 24 | 24 | 26 |
| 1 | Hexane | dm³/h | 72 | 78 | 78 | 72 | 72 | 78 |
| | AlR₃ | mmol/h | 36 (TEA) | 39 (TEA) | 39 (TEA) | 36 (TEA) | 36 (TEA) | 36 (TEA) |
| | H₂/C₂H₄ | | 1.2 | 1.2 | 2.0 | 0.7 | 1.8 | 2.5 |
| | VN | cm³/g | 160 | 150 | 100 | 200 | 140 | 110 |
| | Temperature | °C. | 80 | 80 | 80 | 80 | 80 | 80 |
| | Ethylene | kg/h | 24 | 22 | 22 | 24 | 24 | 22 |
| | Hexane | dm³/h | 72 | 66 | 66 | 72 | 72 | 72 |
| 2 | AlR₃ | mmol/h | 36 (TEA) | 33 (TEA) | 33 (TEA) | 36 (TEA) | 36 (TEA) | 36 (TEA) |
| | H₂/C₂H₄ | | 0.4 | 0.32 | 0.25 | 0.5 | 0.6 | 0.29 |
| | 1-Butene | dm³/h | 2.0 | 2.1 | 2.2 | 0.15 | 2.1 | 2.2 |
| | VN | cm³/g | 250 | 260 | 280 | 240 | 250 | 290 |
| | MFI 190/5 | g/10 min | 1.7 | 1.6 | 1.6 | 1.8 | 1.75 | 1.5 |
| | MFR (81.6/5) | | 14 | 16 | 19 | 11 | 13 | 20 |
| Powder | d | g/cm³ | 0.945 | 0.946 | 0.948 | 0.955 | 0.946 | 0.949 |
| | KA | kg/mmol | 32 | 28 | 25 | 34 | 2.7 | 2.2 |
| | MFI 190/5 | g/10 min | 1.6 | 1.5 | 1.4 | 1.6 | 1.6 | 1.3 |
| Granules | MFR (21.6/5) | | 15 | 16 | 20 | 10 | 14 | 21 |
| | d | g/cm³ | 0.946 | 0.946 | 0.949 | 0.956 | 0.947 | 0.949 |

I claim:

1. A process for the preparation of a polyolefin by two-stage polymerization of ethylene with 0 to 10% by weight, based on the total amount of monomers, of a 1-olefin of the formula $R^6$—CH=CH$_2$, in which $R^6$ denotes a straight-chain or branched alkyl radical with 1 to 12 carbon atoms, in suspension or in the gas phase at a temperature of 20° to 120° C. under a pressure of 2 to 60 bar in the presence of a mixed catalyst consisting of a transition metal component (component (a)), which is the reaction product of a magnesium alcoholate with a titanium compound and an organoaluminum compound, and an organoaluminum compound, the average molecular mass being regulated by hydrogen, which comprises carrying out the polymerization in the presence of a mixed catalyst, component (a) of which has been prepared by reaction of a magnesium alcoholate, suspended in an inert dispersing agent, of the formula (I)

$$Mg(OR^1)(OR^2) \quad (I)$$

in which $R^1$ and $R^2$ are identical or different and denote an alkyl radical with 1 to 6 carbon atoms, with a titanium-IV compound of the formula (II)

$$Tix_m(OR^3)_{4-m} \quad (II)$$

in which $R^3$ denotes an alkyl radical with 1 to 6 carbon atoms, x denotes a halogen atom and m is a number from 2 to 4, and subsequent reaction with an organoaluminum compound of the formula III $$AlR^4{}_n(OR^5)_p X_{3-n-p} \quad (III)$$

in which $R^4$ and $R^5$ are identical or different and denote an alkyl radical with 1 to 12 carbon atoms, X denotes a halogen atom, n is a number from 1 to 2 and p is a number from zero to 0.5, and is introduced only into the first polymerization stage, and component (b) of the mixed catalyst being an aluminumtrialkyl with 1 to 12 carbon atoms in the alkyl radicals or aluminumisoprenyl the molar ratio of component (a) to component (b), based on titanium and aluminum, being 1:1 to 1:500, the molar ratio of hydrogen to ethylene in the gas space being 1:0.01 to 1:0.5 in the one polymerization stage and 1:0.01 to 0.1:8 in the other polymerization stage, and the ratio of the amounts of polyolefins formed in the two polymerization stages being 30:70 to 70:30.

2. A process according to claim 1, wherein the said 1-olefin polymerized with ethylene is propylene, 1-butene 1-pentene, 1-hexene, 4-methylpentene, or 1-octene.

3. A process according to claim 1, wherein X in formulas II and III is chlorine.

4. A process according to claim 1, wherein, in formula III, p is zero.

* * * * *